(12) United States Patent
Lin et al.

(10) Patent No.: US 11,487,429 B1
(45) Date of Patent: Nov. 1, 2022

(54) FLASH TRANSLATION LAYER TABLE PROCESSING METHOD FOR SOLID STATE DRIVE

(71) Applicant: SOLID STATE STORAGE TECHNOLOGY CORPORATION, Taipei (TW)

(72) Inventors: Liang-You Lin, Taipei (TW); Ho-An Lin, Taipei (TW); Chun-Ju Chiu, Taipei (TW)

(73) Assignee: SOLID STATE STORAGE TECHNOLOGY CORPORATION, Taipei (TW)

( * ) Notice: Subject to any disclaimer, the term of this patent is extended or adjusted under 35 U.S.C. 154(b) by 0 days.

(21) Appl. No.: 17/321,541

(22) Filed: May 17, 2021

(30) Foreign Application Priority Data

Apr. 21, 2021 (CN) .......................... 202110431915.8

(51) Int. Cl.
*G06F 3/06* (2006.01)
(52) U.S. Cl.
CPC .......... *G06F 3/0604* (2013.01); *G06F 3/0655* (2013.01); *G06F 3/0679* (2013.01)
(58) Field of Classification Search
None
See application file for complete search history.

(56) References Cited

U.S. PATENT DOCUMENTS

| 2006/0155917 | A1* | 7/2006 | Di Sena | G11C 16/349 711/E12.008 |
|---|---|---|---|---|
| 2012/0303866 | A1* | 11/2012 | Bandic | G11B 5/012 711/112 |
| 2014/0136753 | A1* | 5/2014 | Tomlin | G06F 12/0246 711/E12.008 |
| 2016/0335006 | A1* | 11/2016 | Rose | G06F 3/0688 |
| 2017/0269844 | A1* | 9/2017 | Paley | G06F 3/0619 |
| 2020/0176065 | A1* | 6/2020 | Jung | G06F 12/0246 |

* cited by examiner

*Primary Examiner* — Yaima Rigol
*Assistant Examiner* — Elias Young Kim
(74) *Attorney, Agent, or Firm* — WPAT, PC

(57) ABSTRACT

A FTL table processing method for a solid state drive is provided. When the control circuit intends to perform the backup action on a FTL table, the control circuit calculates the size of a remaining space of a used block. Then, the control circuit judges whether the complete content of the FTL table is required to be backed up to the blank block. If the size of the remaining space of the used block is enough, the control circuit backs up the amended contents of the FTL table and a content changed table to the remaining space of the used block. Whereas, if the size of the remaining space of the used block is not enough, the control circuit backs up the complete content of the FTL table to a plurality of blank blocks.

6 Claims, 9 Drawing Sheets

FLASH TRANSLATION LAYER TABLE PROCESSING METHOD FOR SOLID STATE DRIVE

This application claims the benefit of People's Republic of China application Serial No. 202110431915.8, filed Apr. 21, 2021, the subject matter of which is incorporated herein by reference.

FIELD OF THE INVENTION

The present invention relates to a control method for a solid state drive, and more particularly to a flash translation layer table processing method for a solid state drive.

BACKGROUND OF THE INVENTION

As is well known, a solid state drive (SSD) is a data storage device that uses a non-volatile memory to store data. After data are written into the non-volatile memory, the data are still retained in the solid state drive when the system is powered off.

FIG. 1 is a schematic functional block diagram illustrating the architecture of a conventional solid state drive. As shown in FIG. 1, the solid state drive 10 comprises a control circuit 110, a buffering unit 130 and a non-volatile memory 120. The control circuit 110 is connected with the buffering unit 130 and the non-volatile memory 120.

The control circuit 110 is in communication with a host 12 through an external bus 20. Consequently, commands and data can be exchanged between the control circuit 110 and the host 12. For example, the external bus 20 is a USB bus, a SATA bus, a M.2 bus, a PCIe bus, or the like. The buffering unit 130 can be directly installed in the control circuit 110. For example, the buffering unit 130 is a volatile memory such as a dynamic random access memory (DRAM) or a static random access memory (SRAM). That is, when the system is powered off, the contents stored in the buffering unit 130 are lost.

Generally, the non-volatile memory 120 comprises plural blocks, for example 1024 blocks. Each block comprises plural pages, for example 64 pages. Each page is typically 16 Kbytes in size. That is, the capacity of each block is 1 Mbytes. It is noted that the number of the blocks in the non-volatile memory 120 is not restricted to 1024. Moreover, the number of pages in each block and the size of each page can be determined by the manufacturer of the non-volatile memory 120. That is, the number of pages in each block is not restricted to 64, and the size of each page is not restricted to 16 Kbytes.

Due to the inherent properties of the non-volatile memory 120, at least one page is written by the control circuit 110 during the program action, and the erase operation is performed by the control circuit 110 in a block-wise fashion.

Moreover, the storage space of the buffering unit 130 is divided into plural storage areas. For example, a first storage area of the buffering unit 130 is a data buffering area 132. The write data from the host 12 can be temporarily stored in the data buffering area 132. For example, when the host 12 intends to store the write data into the non-volatile memory 120, the write data received by the control circuit 110 through the external bus 20 are temporarily stored into the data buffering area 132. Moreover, the write data are written from the data buffering area 132 to the non-volatile memory 120 by the control circuit 110 at the proper time.

A second storage area of the buffering unit 130 is used for storing a flash translation layer table (FTL table) 136. The data in the non-volatile memory 120 of the solid state drive 10 can be quickly accessed by the control circuit 110 through the FTL table 136. The functions of the FTL table 136 will be described as follows.

Generally, the host 12 defines the data addresses of the solid state drive 10 through logical block addresses (LBAs). Moreover, the non-volatile memory 120 defines the data addresses of the non-volatile memory 120 through physical allocation addresses (PAAs). Consequently, the solid state drive 10 should have a FTL table for mapping LBA into PAA. The FTL table is stored in the buffering unit 130.

For example, when the host 12 issues a write command, the host 12 also generates a LBA and a write data to notify the control circuit 110 to store the write data into the LBA. Then, the PAA of the non-volatile memory 120 for storing the write data is determined by the control circuit 110. Moreover, the mapping relationship between the LBA and the PAA is recorded in the FTL table 136 by the control circuit 110.

When the host 12 issues a read command, the host 12 generates a LBA. The control circuit 110 confirms the PAA corresponding to the LBA according to the FTL table 136. In addition, the control circuit 110 acquires the read data from the PAA of the non-volatile memory 120 and transmits the read data back to the host 12. According to the recoded contents of the FTL table 136, the control circuit 110 determines the PAA corresponding to the LBA and searches the write data from the non-volatile memory 120.

The operations of the conventional solid state drive 10 and the mapping relationship between the FTL table 136 and the non-volatile memory 120 will be described as follows. FIGS. 2A, 2B and 2C schematically illustrate the mapping relationship between the FTL table and the non-volatile memory of the conventional solid state drive when the control circuit performs the read action and the write action. FIGS. 2D and 2E schematically illustrate the backup action and the loading action of the FTL table when the solid state drive is powered on and powered off.

Please refer to FIG. 2A. It is assumed that the non-volatile memory 120 has six blocks B1~B6 and each block has four storage spaces. For example, in the FTL table 136, b11 denotes the PAA of the first storage space of the first block B1, b12 denotes the PAA of the second storage space of the first block B1, and the rest may be deduced by analog. Moreover, the terms "a", "c" and "d" denote specified numbers.

Please refer to FIG. 2A. Meanwhile, the solid state drive 10 can receive the electric power normally. According to the contents of the FTL table 136, the PAA b11 is mapped to the LBA (a), the PAA b12 is mapped to the LBA (a+1), the PAA b13 is mapped to the LBA (a+2), and the PAA b14 is mapped to the LBA (a+3). That is, the first storage space of the first block B1 stores the data $D_a$ of the LBA (a), the second storage space of the first block B1 stores the data $D_{a+1}$ of the LBA (a+1), the third storage space of B1 stores the data $D_{a+2}$ of the LBA (a+2), and the fourth storage space of the first block B1 stores the data $D_{a+3}$ of the LBA (a+3).

Similarly, the PAA b21 is mapped to the LBA (c). That is, the first storage space of the second block B2 stores the data $D_c$ of the LBA (c). In the FTL table 136, the other PAAs with no mapped LBAs indicate that no data are stored in the other storage spaces of the non-volatile memory 120 or invalid data are stored in the other storage spaces of the non-volatile memory 120. In other words, no valid data are stored in the other storage spaces of the non-volatile memory 120.

Generally, the host 12 can issue a read command to control the solid state drive 10. For example, when the host 12 issues a read command and the LBA (a+2) to the control circuit 110, the control circuit 110 performs a read action. At this time, the control circuit 110 confirms that the LBA (a+2) corresponds to the PAA b13 according to the FTL table 136. Consequently, the control circuit 110 reads the data $D_{a+2}$ in the third storage space of the first block B1, and the control circuit 110 transmits the data $D_{a+2}$ back to the host 12 to complete the read action.

Moreover, the host 12 can issue a write command to control the solid state drive 10. Please refer to FIG. 2B. When the host 12 issues the write command, the LBA (d) and the write data Dd to the control circuit 110, the control circuit 110 performs a write action. Then, the control circuit 110 adds the mapping relationship between the LBA (d) and the PAA b22 to the FTL table 136 and stores the write data Dd into the second storage space of the second block B2 to complete the write action.

Moreover, the host 12 can issue the write command to amend the data corresponding the associated LBAs. Please refer to FIG. 2C. When the host 12 issues the write command, the LBA (a) to the LBA (a+3) and the amended write data $D_a\sim D_{a+3'}$ to the control circuit 110, the control circuit 110 performs the write action. Meanwhile, the control circuit 110 cancels the original mapping relationships between LBA (a)~LBA (a+3) and PAA b11~PAA b14. Consequently, the data $D_a\sim D_{a+3}$ stored in the four storage spaces of the first block B1 become invalid data, which are marked with cross lines. Moreover, in the FTL table 136, LBA (a)~LBA (a+3) are respectively mapped to PAA b23, PAA b24, PAA b31 and PAA b32, and the amended write data $D_a\sim D_{a+3'}$ are respectively stored into the third storage space of the second block B2, the fourth storage space of the second block B2, the first storage space of the third block B3 and the second storage space of the third block B3. Consequently, the write action is completed.

Since all data in the first block B1 become the invalid data, the control circuit 110 can perform an erase action on the first block B1 at the proper time. After the erase action is completed, the first block B1 becomes a blank block. The blank block can be used to store data.

Before the electric power supplied to the solid state drive 10 is stopped, the backup content of the FTL table 136 is written back to a blank storage space of the non-volatile memory 120 by the control circuit 110. Please refer to FIG. 2D. Before the solid state drive 10 is powered off, the complete backup content of the FTL table 136 is stored into the first storage space of the sixth block B6 (i.e., the region marked with oblique lines). After the solid state drive 10 is powered off, the FTL table 136 stored in the buffering unit 130 is lost (see FIG. 2D).

As mentioned above, the FTL table 136 has been stored in the non-volatile memory 120 after the solid state drive 10 is powered off. Consequently, after the solid state drive 10 is powered on again, the latest backup content of the FTL table 136 in the non-volatile memory 120 is loaded into the buffering unit 130 by the control circuit 110. Consequently, the solid state drive 10 can be normally operated. Please refer to FIG. 2E. After the solid state drive 10 is powered on, the content of the FTL table 136 in the first storage space of the sixth block B6 will be loaded to the buffering unit 130.

After the FTL table 136 is loaded into the buffering unit 130 successfully, the control circuit 110 of the solid state drive 10 can be operated normally. That is, the solid state drive 10 can perform the read action and the write action according to the read command and the write command from the host 12. Moreover, when the write action is performed, the mapping relationships between the LBAs and the PAAs in the FTL table 136 is amended by the control circuit 110.

Similarly, when the solid state drive 10 is powered off again, the complete backup content of the FTL table 136 is stored into the blank storage space of the non-volatile memory 120 by the control circuit 110. For example, the complete backup content of the FTL table 136 is stored into the second storage space of the sixth block B6. After the solid state drive 10 is powered on again, the latest backup content of the FTL table 136 in the non-volatile memory 120 is loaded into the buffering unit 130 by the control circuit 110. That is, the latest backup content of the FTL table 136 in the second storage space of the sixth block B6 is loaded to the buffering unit 130. Meanwhile, the content in the first storage space of the sixth block B6 is changed to an invalid data.

As mentioned above, the mapping relationships between the LBAs and the PAAs are stored in the FTL table 136. If the contents of the FTL table 136 are erroneous, the control circuit 110 is unable to find out the accurate data. When the solid state drive 10 is powered on and operated normally, the content of the FTL table 136 is stored in the buffering unit 130. Consequently, the mapping relationships between the LBAs and the PAAs can be read, stored and amended quickly. Before the solid state drive 10 is powered off, the control circuit 110 backs up the complete content of the FTL table 136 to the non-volatile memory 120. After the solid state drive 10 is powered on again, the latest backup content of the FTL table 136 is loaded from the non-volatile memory 120 to the buffering unit 130 by the control circuit 110. Consequently, the solid state drive 10 can be operated normally.

As mentioned above, the control circuit 110 needs to amend the mapping relationships in the FTL table 136. Moreover, in some other situations, the FTL table 136 also needs to be amended. For example, when the control circuit 110 performs a garbage collection, the valid data in the block to be erased needs to be moved to other blocks, and the control circuit 110 needs to amend the mapping relationships in the FTL table 136. In other words, when the valid data is written into the non-volatile memory 120 or the valid data is moved in the non-volatile memory 120, the control circuit 110 needs to amend the mapping relationships in the FTL table 136.

FIG. 3A to FIG. 3D schematically illustrate a process of processing a FTL table when a conventional solid state drive is turned on/off. Generally, the content of the FTL table 136 gradually increases with the increasing content of the non-volatile memory 120. For example, as shown in FIG. 3A, the non-volatile memory 120 of the 4 Gbyte solid state drive 10 comprises four channels CH1~CH4. Each channel contains 1024 blocks. Each block comprises 64 pages. Each page is typically 16 Kbytes in size. In the 4 Gbyte solid state drive 10, the size of the FTL table 136 in the buffering unit 130 is about 2 Mbytes~3 Mbytes. That is, the size of the FTL table 136 is larger than the size of two blocks and smaller than the size of three blocks. When the control circuit 110 backs up the FTL table 136 to the non-volatile memory 120, it is necessary to use three blocks of the non-volatile memory 120 to store the FTL table 136.

Please refer to FIG. 3A. When the solid state drive 10 is powered on, the control circuit 110 loads the complete FTL table from the blocks $B_{4084}$, $B_{4085}$ and $B_{4086}$ of the non-volatile memory 120 to the buffering unit 130.

Please refer to FIG. 3B. The solid state drive 10 is operated normally. Generally, whenever the valid data is written into the non-volatile memory 120 or the valid data is moved in the non-volatile memory 120, the control circuit 110 has to amend the FTL table 136. The steps of the method of amending the FTL table 136 is similar to those shown in FIGS. 2A to 2E, and not redundantly described herein. In other words, after the FTL table 136 in the buffering unit 130 is amended by the control circuit 110, the content of the FTL table 136 and the content stored in the blocks $B_{4084}$, $B_{4085}$ and $B_{4086}$ becomes different.

Please refer to FIG. 3C. When the solid state drive 10 is powered off, the control circuit 110 backs up the complete FTL table 136 from the buffering unit 130 to the blocks $B_{4087}$, $B_{4088}$ and $B_{4089}$ of the non-volatile memory 120. Meanwhile, the contents originally stored in the locks $B_{4084}$, $B_{4085}$ and $B_{4086}$ of the non-volatile memory 120 become invalid data, which are marked with cross lines.

Please refer to FIG. 3D. When the solid state drive 10 is powered on again, the control circuit 110 loads the complete FTL table from the blocks $B_{4087}$, $B_{4088}$ and $B_{4089}$ of the non-volatile memory 120 to the buffering unit 130.

As mentioned above, whenever the solid state drive 10 is powered off and then powered on again, there are three blocks of the non-volatile memory 120 become to store the invalid data. For reusing these three blocks, the control circuit 110 performs an erase action. Consequently, the three blocks storing the invalid data are erased as three blank blocks. Meanwhile, the program/erase count (also referred as P/E count) is increased by 1.

Generally, the blocks in the non-volatile memory 120 with the higher P/E count are readily suffered from damage. That is, the life time of the non-volatile memory 120 is related to the P/E count of the blocks. For example, if the solid state drive 10 is turned on/off for 100 times, there are 300 blocks of the non-volatile memory 120 become to store the invalid data. After the erase action is completed, the P/E count for each of the 300 blocks is increased by 1. In other words, the life time of the non-volatile memory 120 is shortened.

SUMMARY OF THE INVENTION

An embodiment of the present invention provides a flash translation layer table processing method for a solid state drive. The solid state drive includes a control circuit, a buffering unit and a non-volatile memory. The control circuit is connected with the buffering unit and the non-volatile memory. The flash translation layer table processing method includes the following steps. When the solid state drive is powered on, a flash translation layer table is loaded from plural used blocks of the non-volatile memory to the buffering unit. A size of the flash translation layer table is smaller than a total size of the plural used blocks. When a valid data is written into the non-volatile memory or the valid data is moved in the non-volatile memory, the flash translation layer table in the buffering unit is amended and at least one position of at least one amended content of the flash translation layer table is recorded in a content changed table. Then, the control circuit judges whether a backup action on the flash translation layer table is required. If the backup action on the flash translation layer table is required, the control circuit determines whether a complete content of the flash translation layer table is required to be backed up to the non-volatile memory according to a total data size of the at least one amended content of the flash translation layer table and the content changed table.

Numerous objects, features and advantages of the present invention will be readily apparent upon a reading of the following detailed description of embodiments of the present invention when taken in conjunction with the accompanying drawings. However, the drawings employed herein are for the purpose of descriptions and should not be regarded as limiting.

BRIEF DESCRIPTION OF THE DRAWINGS

The above objects and advantages of the present invention will become more readily apparent to those ordinarily skilled in the art after reviewing the following detailed description and accompanying drawings, in which.

DETAILED DESCRIPTION OF PREFERRED EMBODIMENTS

When the solid state drive is operated normally and the valid data need to be written into or moved in the non-volatile memory 120, the control circuit needs to amend the mapping relationships in the FTL table. In case that the solid state drive is powered off and abnormally interrupted, the FTL table in buffering unit is lost. For solving this problem, it is necessary to back up the FTL table before the solid state drive is powered off. Consequently, the content of the FTL table is stored into the non-volatile memory. Moreover, when the solid state drive is in the normal working state, the control circuit needs to back up the FTL table regularly or irregularly.

In practical applications, whenever the control circuit backs up the FTL table, only a small portion of the content in the FTL table of the solid state drive is amended, but most of the content is not modified. If the complete backup content of the FTL table is stored into the blank blocks of the non-volatile memory at each backup time, the program/erase count of the non-volatile memory increases rapidly. Consequently, the life time of the solid state drive is shortened. Moreover, since so many complete backup FTL tables occupy much storage space of the non-volatile memory, the utilization efficiency of the storage space in the non-volatile memory is deteriorated.

The present invention provides a flash translation layer (FTL) table processing method for a solid state drive. A portion of the buffering unit of the solid state drive is used as a content changed table for recording the position in the FTL table where the content is changed. Whenever the FTL table is backed up, the control circuit can determine the method of backing up the FTL table. For example, the control circuit can select to back up the changed content of the FTL table to a used block of the non-volatile memory or to back up the complete content of the FTL table to a blank block of the non-volatile memory. The operations of the FTL table processing method will be described as follows.

Figure 4:
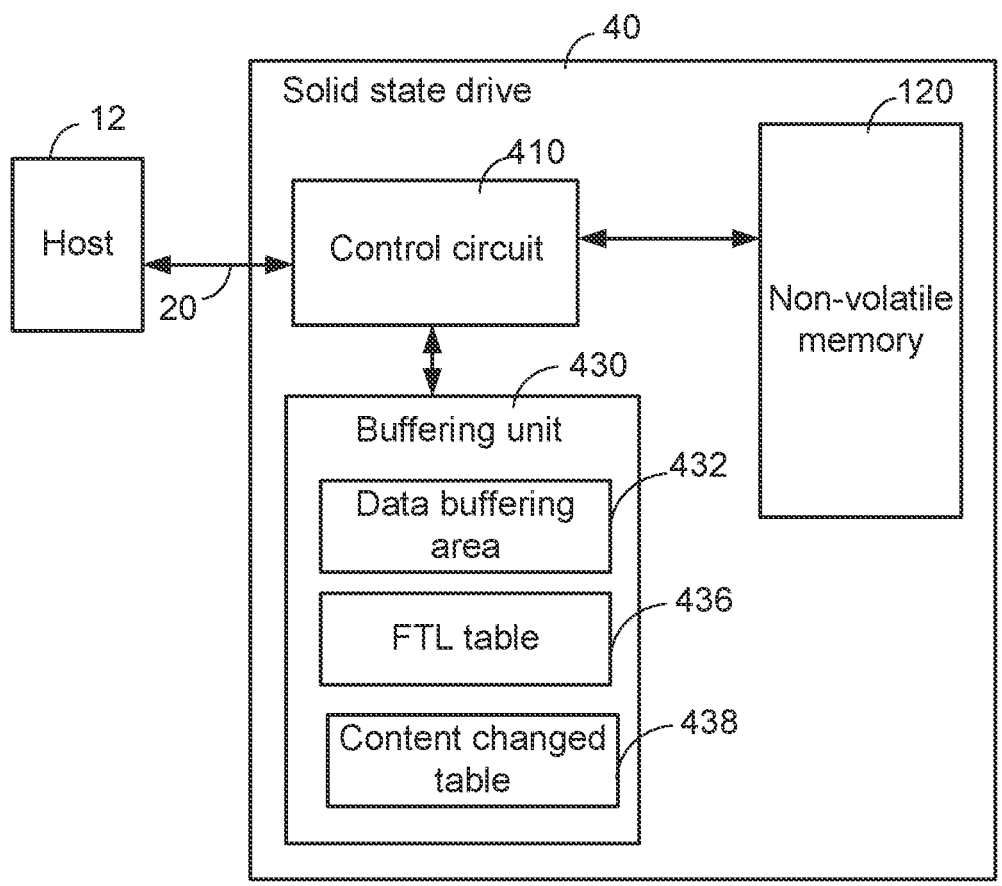
FIG. 4 is a schematic functional block diagram illustrating a solid state drive according to an embodiment of the present invention.

FIG. 4 is a schematic functional block diagram illustrating a solid state drive according to an embodiment of the present invention. As shown in FIG. 4, the solid state drive 40 comprises a control circuit 410, a buffering unit 430 and a non-volatile memory 120. The control circuit 410 is connected with the buffering unit 430 and the non-volatile memory 120. The control circuit 410 is in communication with a host 12 through an external bus 20. Consequently, commands and data can be exchanged between the control circuit 210 and the host 12.

Generally, the non-volatile memory 120 comprises plural blocks, for example 1024 blocks. Each block comprises plural pages, for example 64 pages. Each page is typically 16 Kbytes in size. That is, the capacity of each block is 1 Mbytes. It is noted that the number of the blocks in the non-volatile memory 120 is not restricted to 1024. Moreover, the number of pages in each block and the size of each page can be determined by the manufacturer of the non-volatile memory 120. That is, the number of pages in each block is not restricted to 64, and the size of each page is not restricted to 16 Kbytes.

Due to the inherent properties of the non-volatile memory 120, at least one page is written by the control circuit 410 during the program action, and the erase operation is performed by the control circuit 410 in a block-wise fashion.

Moreover, the storage space of the buffering unit 430 is divided into plural storage areas. For example, a first storage area of the buffering unit 430 is a data buffering area 432, a second storage area of the buffering unit 430 is used for storing a FTL table 436, and a third storage area of the buffering unit 430 is used for storing a content changed table 438.

The write data from the host 12 can be temporarily stored in the data buffering area 432. For example, when the host 12 intends to store the write data into the non-volatile memory 120, the write data received by the control circuit 410 through the external bus 20 are temporarily stored into the data buffering area 432. Moreover, the write data are written from the data buffering area 432 to the non-volatile memory 120 by the control circuit 410 at the proper time.

Moreover, the mapping relationship between the LBA and the PAA is recorded in the FTL table 436 by the control circuit 410. Generally, whenever the valid data is written into the non-volatile memory 120 or the valid data is moved in the non-volatile memory 120, the control circuit 410 has to amend the FTL table 436. The steps of the method of amending the FTL table 436 is similar to those shown in FIGS. 2A to 2E, and not redundantly described herein.

Figure 1:
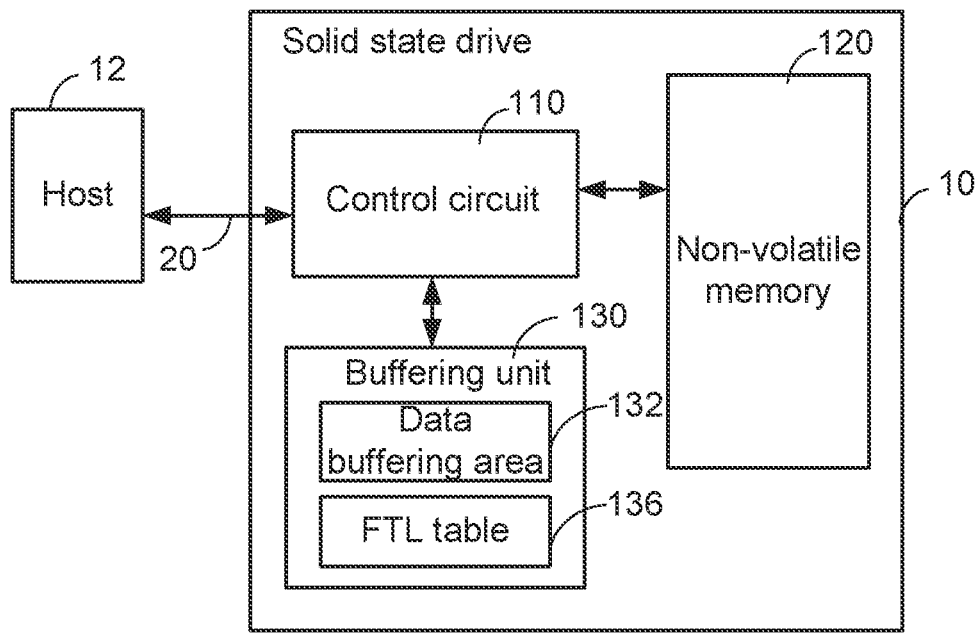
FIG. 1 (prior art) is a schematic functional block diagram illustrating a conventional solid state drive.
Figure 2A:
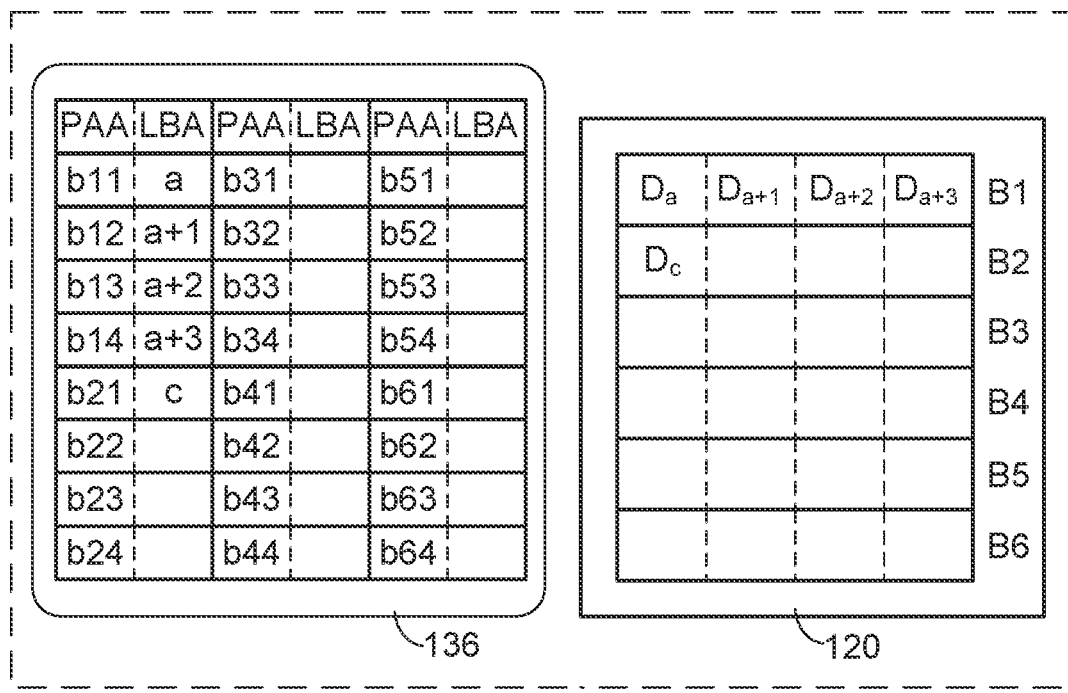
FIGS. 2A, 2B and 2C (prior art) schematically illustrate the mapping relationship between the FTL table and the non-volatile memory of the conventional solid state drive when the control circuit performs the read action and the write action.
Figure 2B:
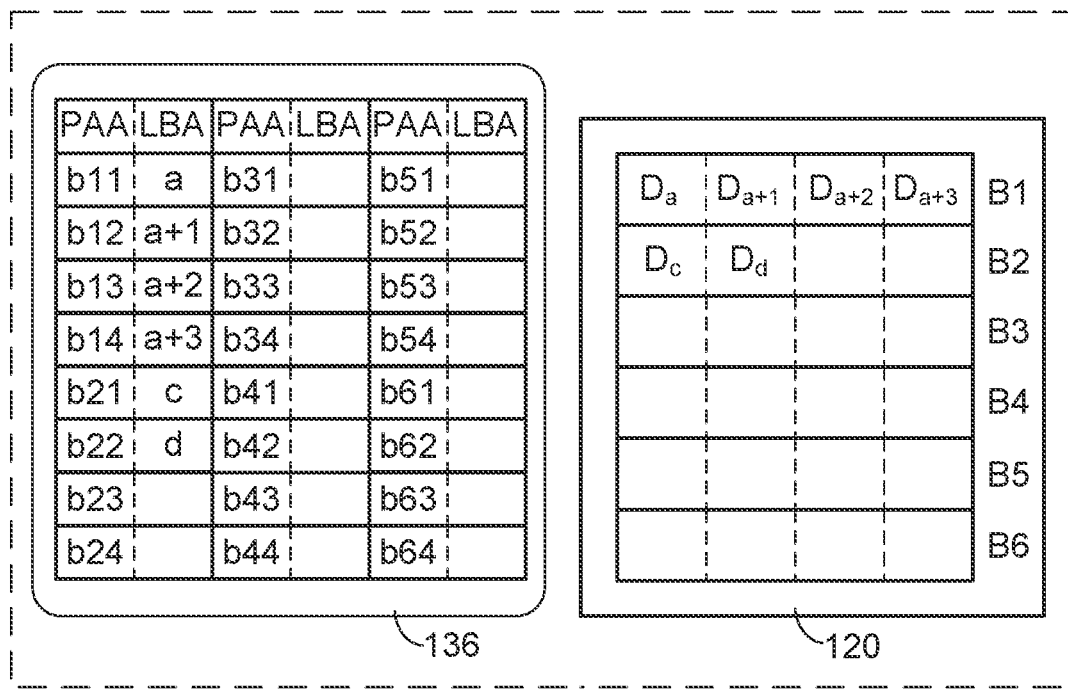
Figure 2C:
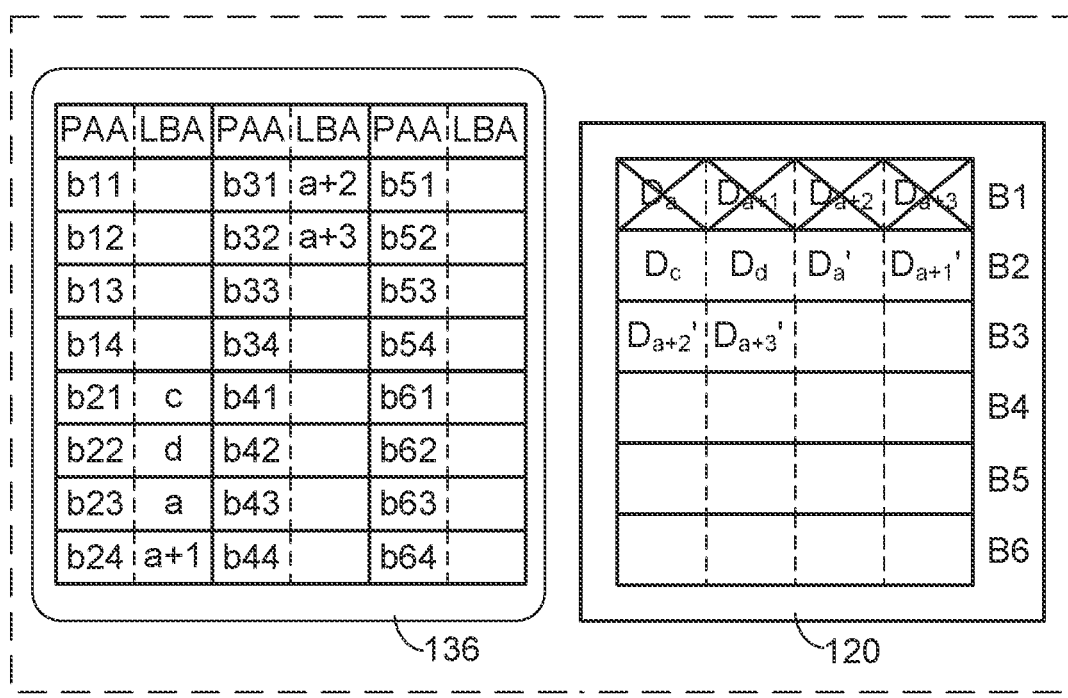
Figure 2D:
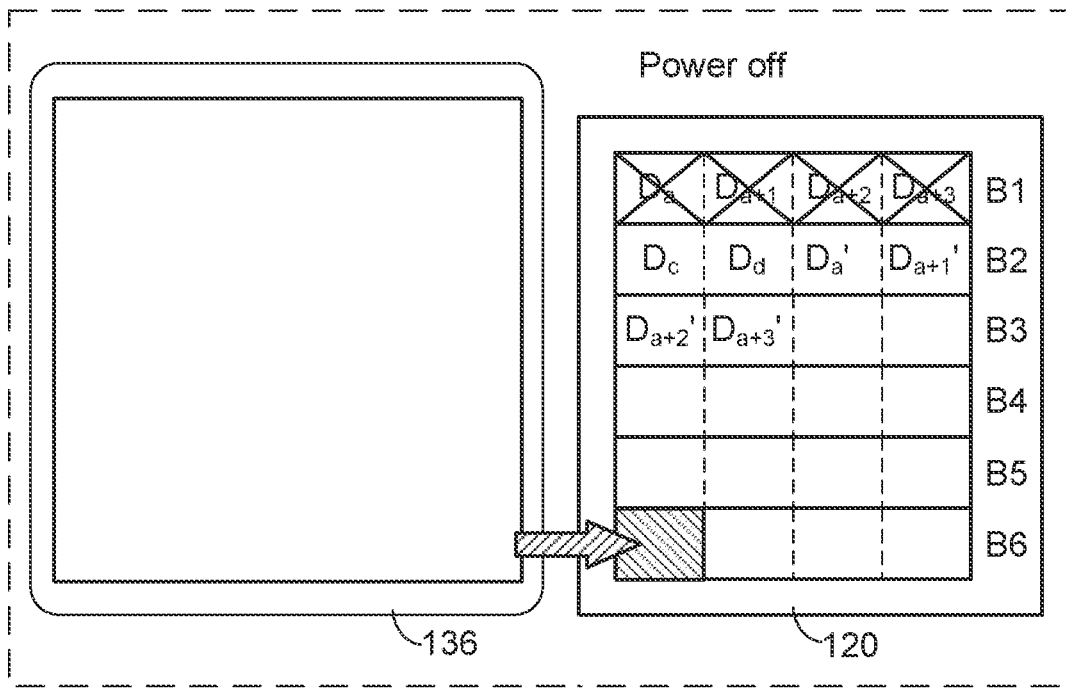
FIGS. 2D and 2E (prior art) schematically illustrate the backup action and the loading action of the FTL table when the solid state drive is powered on and powered off.
Figure 2E:
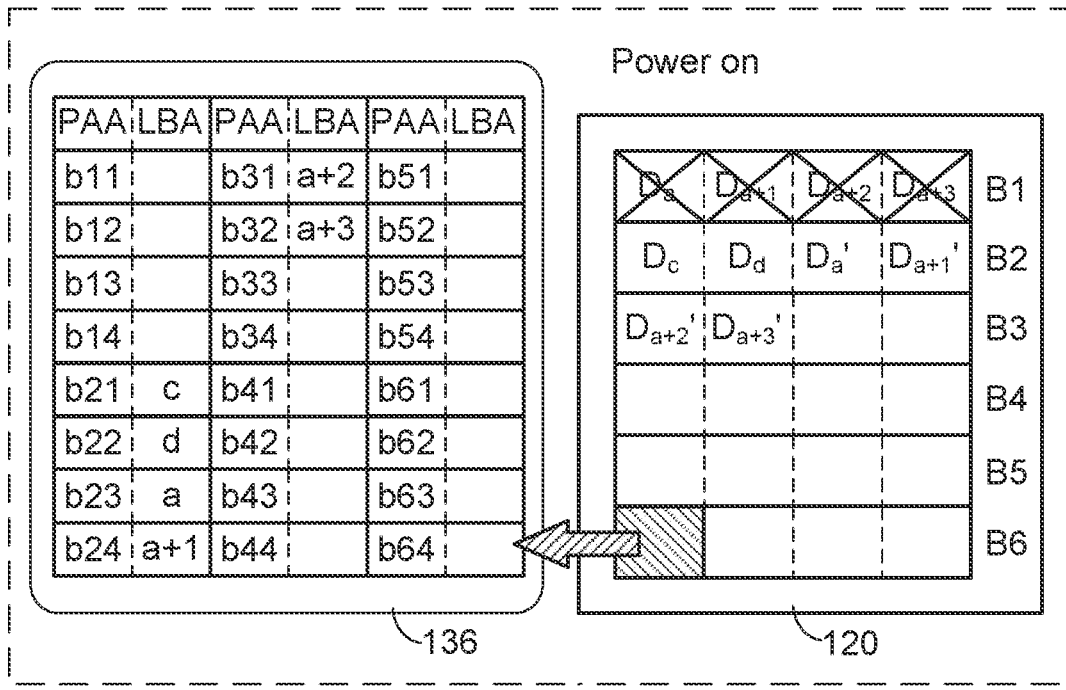
Figure 3A:
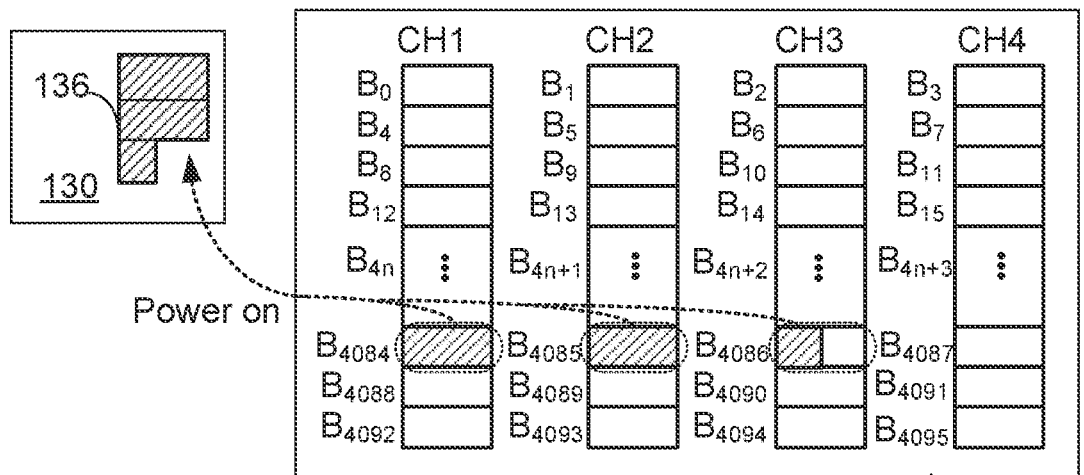
FIG. 3A to FIG. 3D (prior art) schematically illustrate a process of processing a FTL table when a conventional solid state drive is turned on/off.
Figure 3B:
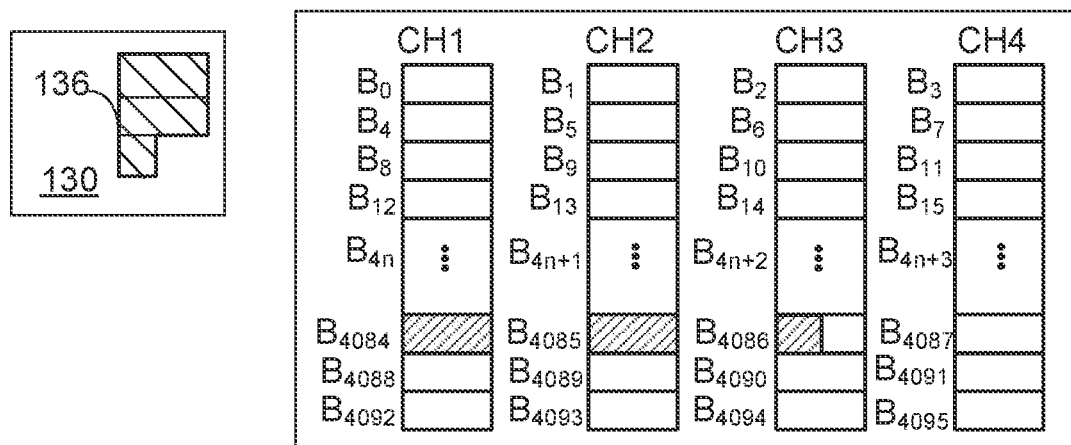
Figure 3C:
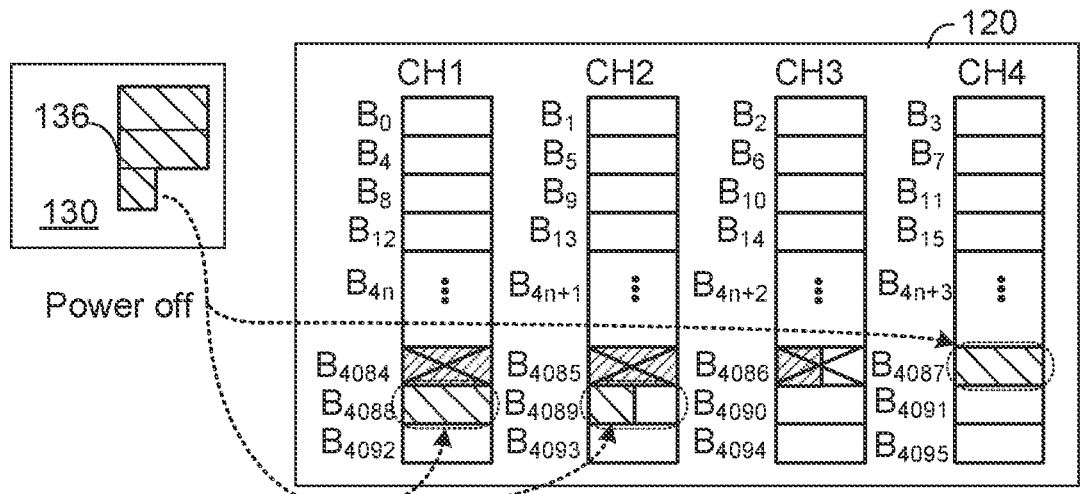
Figure 3D:
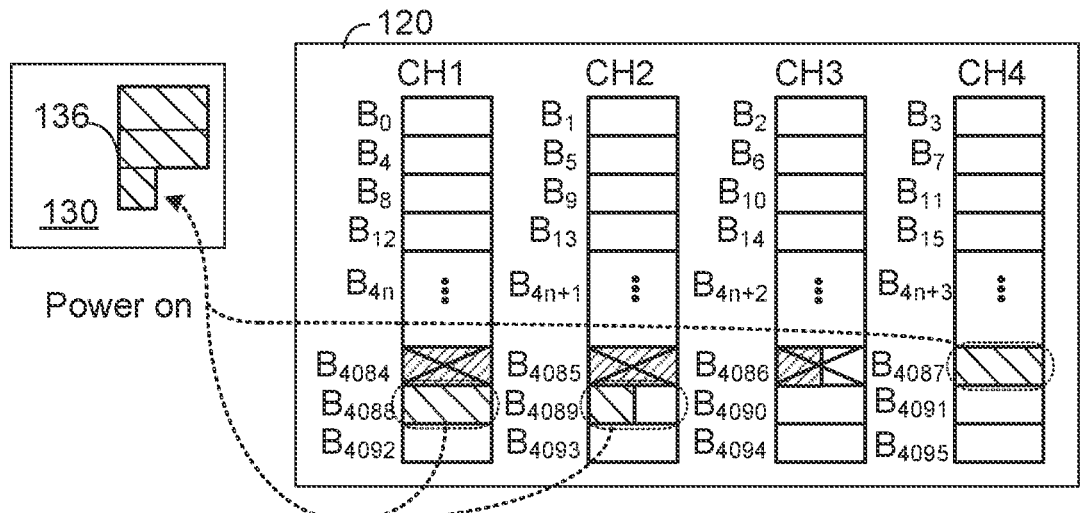

After the solid state drive 40 is powered on, the solid state drive 40 is in the normal working state. When the FTL table 436 is amended, the FTL table 436 contains the amended content. The amended content is recorded in the content changed table 438. That is, the position of the amended content of the FTL table 436 in the second storage area of the buffering unit 430 is recorded in the content changed table 438. That is, the position of the amended content in the FTL table 436 can be realized from the content changed table 438. For example, as shown in FIG. 2B, the mapping relationship between the LBA (d) and the PAA b22 is newly added to the FTL table 436. In other words, the LBA (d) is the amended content. Then, the position of the LBA (d) in the FTL table 436 is recorded in the content changed table 438 by the control circuit 410.

Before the solid state drive 40 is powered off, or when the solid state drive 40 is in the normal working state and ready to back up the FTL table, the control circuit 410 determines whether to back up the complete FTL table according to the total data size of the content changed table 438 and the amended content of the FTL table 436. If the control circuit 410 determines not to back up the complete FTL table, the control circuit 410 only backs up the amended content of the FTL table 436 to a used block of the non-volatile memory 120 according to the content changed table 438, and the control circuit 410 does not back up the unchanged content of the FTL table 436 to the non-volatile memory 120. Since the data size of the backup content is low, the program/erase count of the block can be effectively reduced. In an embodiment, the used block is the block of the non-volatile memory 120 that stores the previous backup FTL table.

Figure 5A:
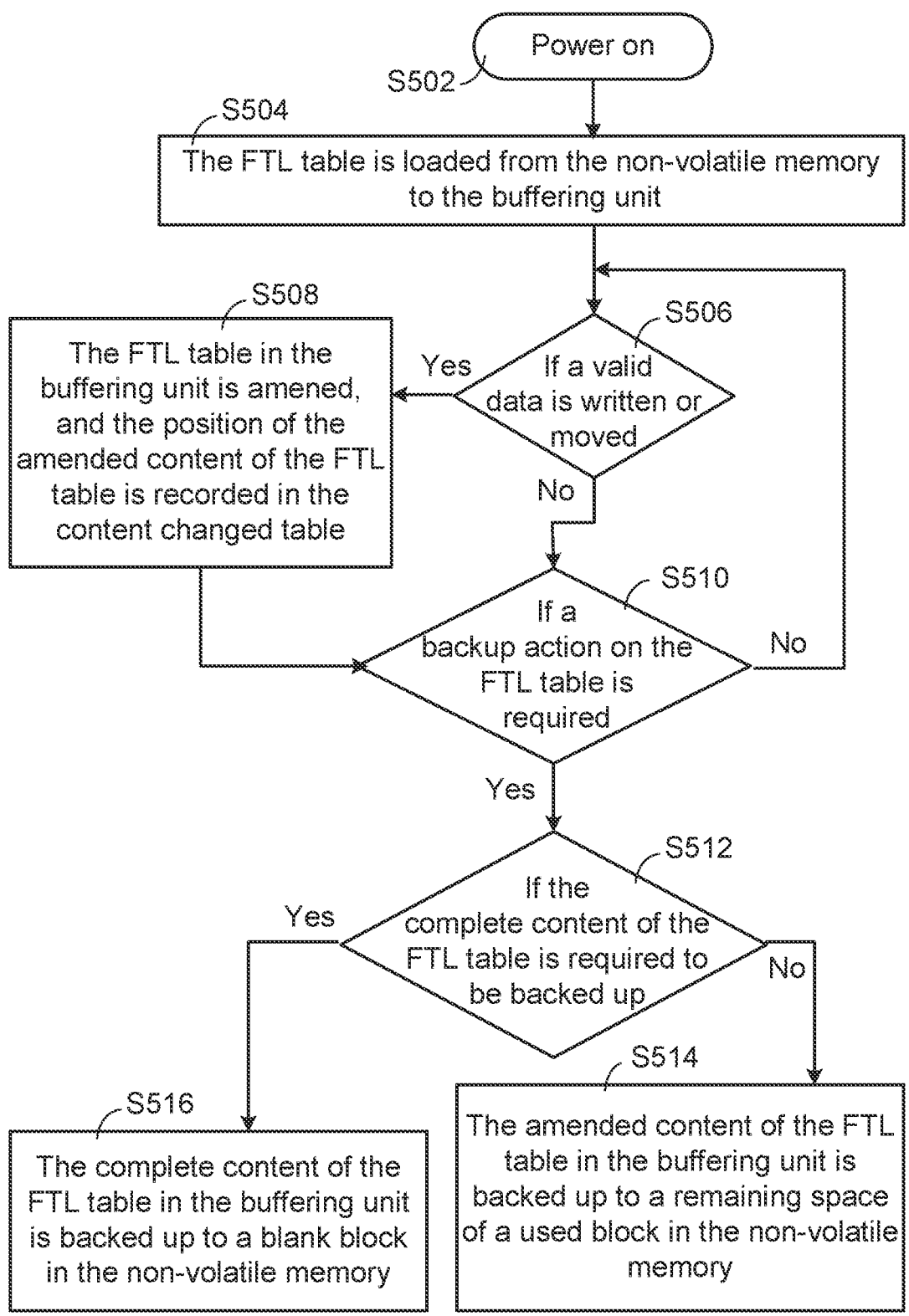
FIG. 5A is a flowchart illustrating a FTL table processing method for a solid state drive according to an embodiment of the present invention.

FIG. 5A is a flowchart illustrating a FTL table processing method for a solid state drive according to an embodiment of the present invention. After the solid state drive 40 is powered on (Step S502), the control circuit 410 loads a FTL table from the non-volatile memory 120 to the buffering unit 430 (Step S504). When the solid state drive 40 is in a normal working state, if a valid data is written or moved (Step S506), the control circuit 410 amends the FTL table 436 in the buffering unit 430, and a position of an amended content of the FTL table in the buffering unit 430 is recorded in the content changed table 438 (Step S508).

Then, a step S510 is performed to judge whether the solid state drive 40 intends to perform a backup action on the FTL table 436. If the judging condition of the step S510 indicates that the solid state drive 40 does not intend to perform the backup action on the FTL table 436, the solid state drive 40 is continuously in the normal working state and the step S506 is repeatedly done. If the judging condition of the step S510 indicates that the solid state drive 40 intends to perform the backup action on the FTL table 436, the control circuit 410 judges whether a complete content of the FTL table 436 is required to be backed up (Step S512). If the judging condition of the step S512 is not satisfied, the control circuit 410 backs up the amended content of the FTL table 436 in the buffering unit 430 to a remaining space of a used block in the non-volatile memory 120 (Step S514). Whereas, If the judging condition of the step S512 is satisfied, the control circuit 410 backs up the complete content of the FTL table 436 in the buffering unit 430 to a blank block in the non-volatile memory 120 (Step S516).

FIG. 5B to FIG. 5H schematically illustrate the operations of the FTL table processing method according to the embodiment of the present invention.

Figure 5B:
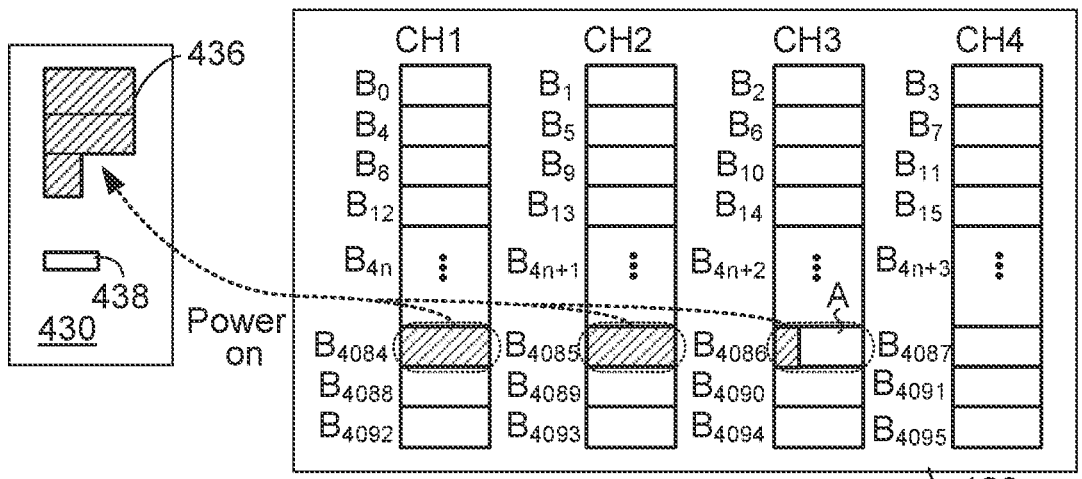
FIG. 5B to FIG. 5H schematically illustrate the operations of the FTL table processing method according to the embodiment of the present invention.

As shown in FIG. 5B, the non-volatile memory 120 of the 4 Gbyte solid state drive 40 comprises four channels CH1~CH4. Each channel contains 1024 blocks. Each block comprises 64 pages. Each page is typically 16 Kbytes in size. In the 4 Gbyte solid state drive 40, the size of the FTL table 436 in the buffering unit 430 is about 2 Mbytes~3 Mbytes. That is, the size of the complete FTL table 436 is larger than the size of two blocks and smaller than the size of three blocks. When the control circuit 410 backs up the complete FTL table 436 to the non-volatile memory 120, it is necessary to use three blocks of the non-volatile memory 120 to store the FTL table 436. Since the size of the complete FTL table 436 is larger than the size of two blocks and smaller than the size of three blocks, there is a remaining space in one of the three blocks of the non-volatile memory 120 after storing the complete FTL table 436. For example, as shown in FIG. 5B, the complete FTL table 436 is stored in the blocks $B_{4084}$, $B_{4085}$ and $B_{4086}$ of the non-volatile memory 120. In addition, there is a remaining space A in the block $B_{4086}$.

Please refer to FIG. 5B. When the solid state drive 40 is powered on, the control circuit 410 loads the contents of the blocks $B_{4084}$, $B_{4085}$ and $B_{4086}$ of the non-volatile memory 120 to the buffering unit 430 and establishes the FTL table 436. Since no valid data are written into or moved in the non-volatile memory 120, no information is stored in the content changed table 438 in the buffering unit 430.

When the solid state drive 40 is in the normal working state and a valid data is written into or moved in the non-volatile memory 120, the control circuit 410 amends the FTL table 436 in the buffering unit 430. Consequently, the FTL table 436 contains an amended content. Since the FTL table 436 has been amended, the position of the amended content of the FTL table 436 is recorded in the content changed table 438 by the control circuit 410.

In an embodiment, the FTL table 436 is divided into plural table areas in the unit of a 16 Kbyte page size. Each table area corresponds to a position of the FTL table 436. Each position of the FTL table 436 corresponds to an address information in the buffering unit 430.

Figure 5C:
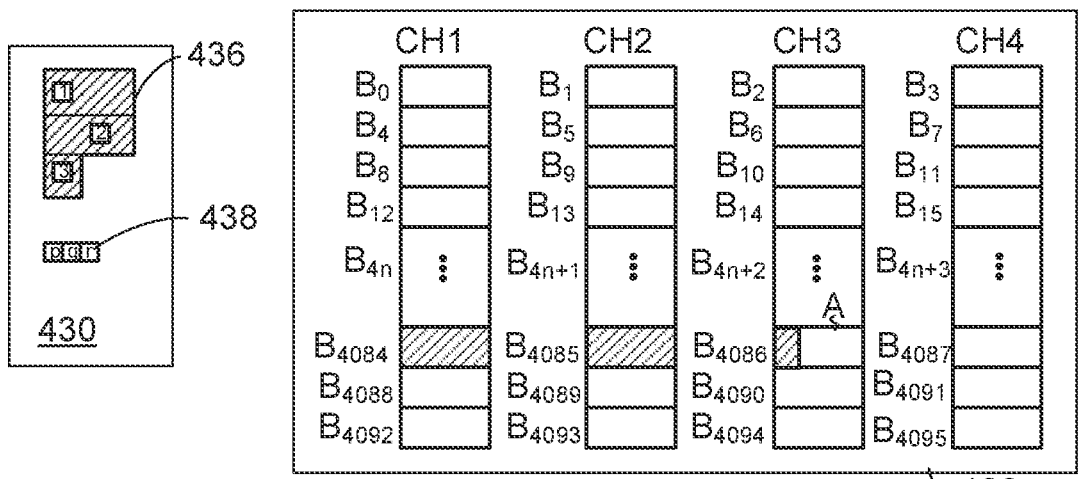

Please refer to FIG. 5C. When the solid state drive 40 is in the normal working state, the contents of three table areas of the FTL table 436 are amended. Consequently, there are three amended contents 1, 2 and 3 in the FTL table 436. At the same time, the control circuit 410 records the positions of three amended table areas of the FTL table 436 (i.e., the positions p, q and r) in the content changed table 438. According to the positions p, q and r recorded in the content changed table 438, the control circuit 410 realizes that the three table areas corresponding to the three positions (p, q and r) of the FTL table 436 respectively store the amended contents 1, 2 and 3. That is, the positions p, q and r are the address information in the buffering unit 430.

Figure 5D:
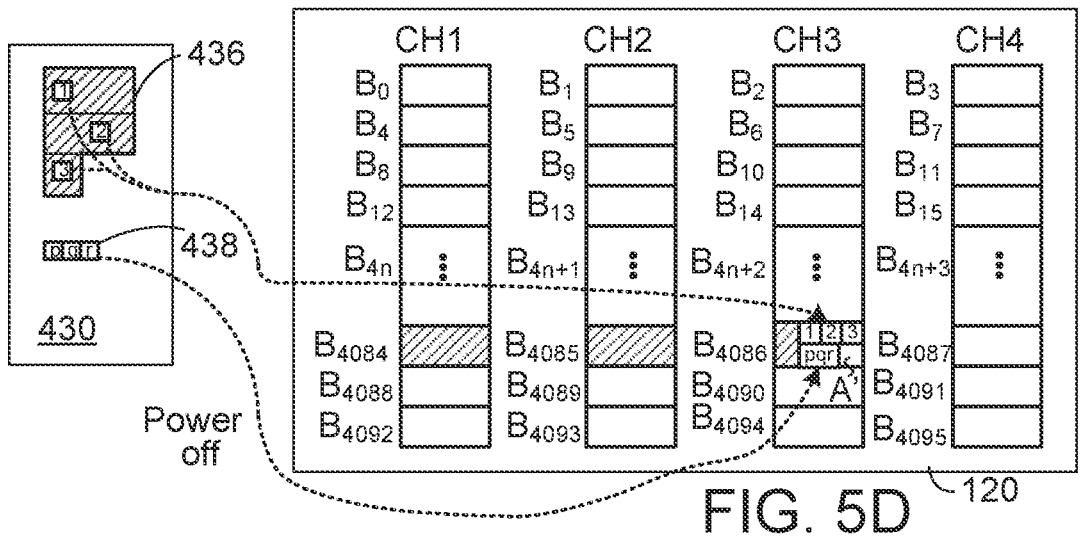

Please refer to FIG. 5D. It is assumed that the total data size of the amended contents 1, 2 and 3 of the FTL table 436 and the content changed table 438 is smaller than the storable data size of the remaining space A of the block $B_{4086}$ after the situation of FIG. 5C. Consequently, when the solid state drive 40 intends to perform a backup action on the FTL table 436 (for example, the solid state drive 40 is ready to be powered off), the control circuit 401 stores the amended contents 1, 2 and 3 of the FTL table 436 and the content changed table 438 into the remaining space A of the block $B_{4086}$. In other words, if the block $B_{4086}$ is the used block and the size of the remaining space A is enough, the control circuit 401 backs up the amended contents 1, 2 and 3 of the FTL table 436 and the content changed table 438 to the remaining space A of the block $B_{4086}$.

After the amended contents 1, 2 and 3 of the FTL table 436 and the content changed table 438 are backed up to the remaining space A of the block $B_{4086}$, the remaining space A of the block $B_{4086}$ is reduced to the remaining space A' (see FIG. 5D).

Figure 5E:
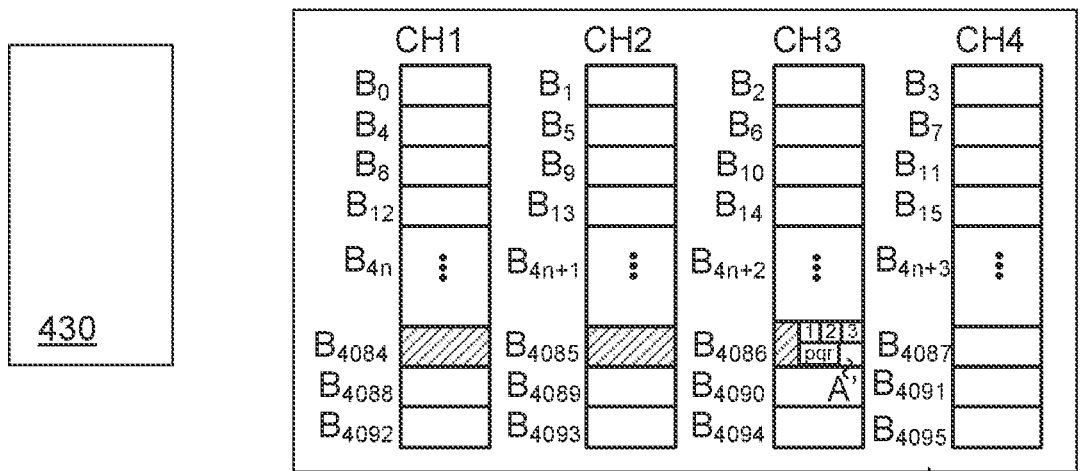

Please refer to FIG. 5E. After the solid state drive 40 is powered off, the contents stored in the buffering unit 430 are all lost.

Figure 5F:
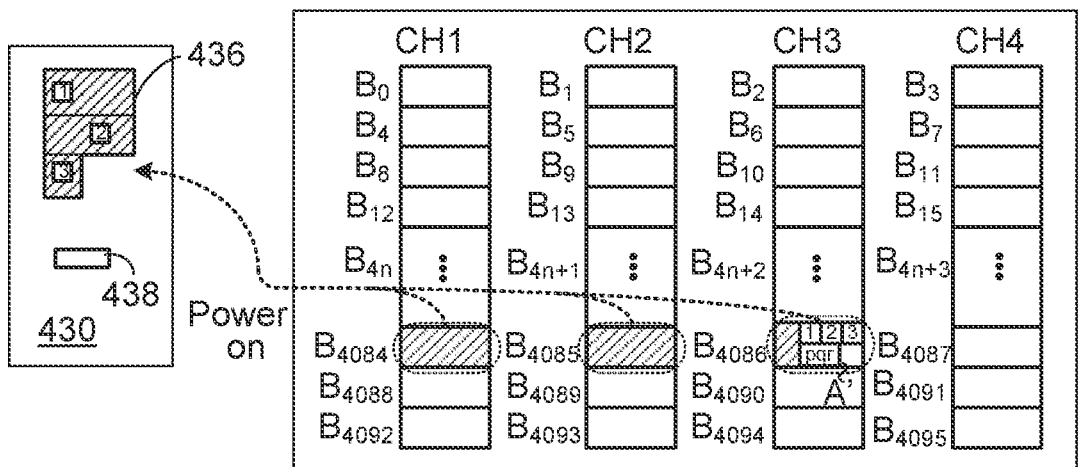

Please refer to FIG. 5F. When the solid state drive 40 is powered on again, the control circuit 410 loads the contents of the blocks $B_{4084}$, $B_{4085}$ and $B_{4086}$ of the non-volatile memory 120 to the buffering unit 430 and establishes the FTL table 436. For example, the control circuit 410 reads the contents of the blocks $B_{4084}$, $B_{4085}$ and $B_{4086}$ sequentially and establishes the backup FTL table, and then the control circuit 410 updates the FTL table 436 according to the content changed table 438 in the remaining space A. In other words, according to the content changed table 438 in the remaining space A, the control circuit 410 realizes that the contents of the FTL table 436 corresponding to the positions p, q and r have been amended. In addition, the backup amended contents 1, 2 and 3 are updated to table areas of the FTL table 436 corresponding to the positions p, q and r. Consequently, the content of the FTL table 436 is completely identical to the content of the FTL table 436 before the solid state drive 40 is powered off. Since no valid data are written into or moved in the non-volatile memory 120, no information is stored in the content changed table 438 in the buffering unit 430. That is, the positions p, q and r before the previous power-off event do not been stored in the content changed table 438.

The method of loading the FTL table 436 may be varied according to the practical requirements. For example, while the control circuit 410 loads the contents of the blocks $B_{4084}$, $B_{4085}$ and $B_{4086}$ of the non-volatile memory 120 to the buffering unit 430, the control circuit 410 updates the FTL table 436 according to the content changed table 438 in the remaining space A. For example, the table area of the FTL table 436 corresponding to the position p is directly replaced by the content 1, the table area of the FTL table 436 corresponding to the position q is directly replaced by the content 2, and the table area of the FTL table 436 corresponding to the position r is directly replaced by the content 3. Consequently, after the FTL table 436 is established, the content of the FTL table 436 is completely identical to the content of the FTL table 436 before the solid state drive 40 is powered off. In other words, during the process of reading the blocks $B_{4084}$, $B_{4085}$ and $B_{4086}$, the FTL table 436 is established by referring to the amended contents 1, 2 and 3 that are pointed by the content changed table 438.

Figure 5G:
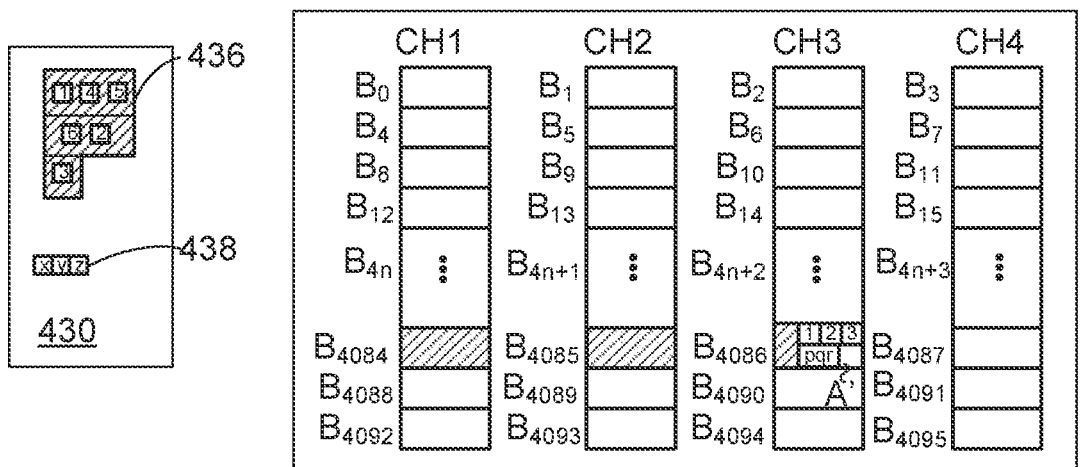

Please refer to FIG. 5G. When the solid state drive 40 is in the normal working state and a valid data is written into or moved in the non-volatile memory 120, the control circuit 410 amends the FTL table 436 in the buffering unit 430. Consequently, the FTL table 436 contains an amended content. For example, there are three amended contents 4, 5 and 6 in the FTL table 436. At the same time, the control circuit 410 records the positions of three amended table areas of the FTL table 436 (i.e., the positions x, y and z) in the content changed table 438. According to the positions x, y and z recorded in the content changed table 438, the control circuit 410 realizes that the three table areas corresponding to the three positions (x, y and z) of the FTL table 436 respectively store the amended contents 4, 5 and 6. That is, the positions x, y and z are the address information in the buffering unit 430.

Figure 5H:
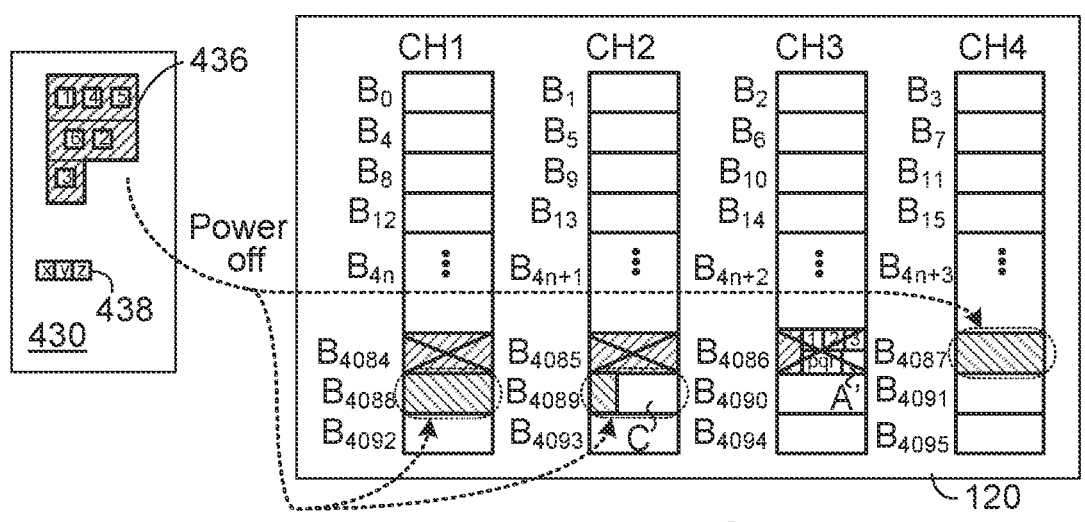

Please refer to FIG. 5H. It is assumed that the total data size of the amended contents 4, 5 and 6 of the FTL table 436 and the content changed table 438 is larger than the storable data size of the remaining space A' of the block $B_{4086}$ after the situation of FIG. 5G. Consequently, when the solid state drive 40 intends to perform a backup action on the FTL table 436 again (for example, the solid state drive 40 is ready to be powered off), the control circuit 401 backs up the complete FTL table 436 to the blocks $B_{4087}$, $B_{4088}$ and $B_{4089}$ of the non-volatile memory 120. Meanwhile, the contents originally stored in the locks $B_{4084}$, $B_{4085}$ and $B_{4086}$ of the non-volatile memory 120 become invalid data, which are marked with cross lines. In other words, the locks $B_{4084}$, $B_{4085}$ and $B_{4086}$ will be erased as blank blocks by the control circuit 401 at a properly time.

Since the size of the complete FTL table 436 is larger than the size of two blocks and smaller than the size of three blocks, there is a remaining space in one of the three blocks of the non-volatile memory 120 after storing the complete FTL table 436. For example, as shown in FIG. 5H, after the complete FTL table 436 is stored in the blocks $B_{4087}$, $B_{4088}$ and $B_{4089}$ of the non-volatile memory 120, there is a remaining space C in the block $B_{4089}$.

Similarly, when the solid state drive 40 is powered on, the control circuit 410 loads the contents of the blocks $B_{4087}$, $B_{4088}$ and $B_{4089}$ of the non-volatile memory 120 to the buffering unit 430 and establishes the FTL table 436. When the solid state drive 40 intends to perform the backup action on the FTL table 436, the control circuit 401 judges whether the complete content of the FTL table 436 is required to be backed up according to the remaining space C.

On contrast, if the total data size of the amended contents 4, 5 and 6 of the FTL table 436 and the content changed table 438 is smaller than the storable data size of the remaining space A' of the block $B_{4086}$ after the situation of FIG. 5G, the control circuit 401 backs up the amended contents 4, 5 and 6 of the FTL table 436 and the content changed table 438 to the remaining space A' of the block $B_{4086}$.

From the above descriptions, the present invention provides a FTL table processing method for a solid state drive. When the control circuit 410 intends to perform the backup action on the FTL table 436, the control circuit 410 calculates the size of the remaining space of the used block for storing the backup FTL table 436 and further judges whether the complete content of the FTL table 436 is required to be backed up to the blank block. The used block is the block of the non-volatile memory 120 that stores the previous backup FTL table.

If the size of the remaining space of the used block is enough, the control circuit 401 backs up the amended contents (i.e., 1, 2 and 3) of the FTL table 436 and the content changed table 438 to the remaining space of the used block. Whereas, if the size of the remaining space of the used block is not enough, the control circuit 401 backs up the complete content of the FTL table 436 to the blank block.

In most situations, as long as the size of the remaining space of the used block storing the previous backup FTL table is enough, the control circuit 410 performs the backup action on the FTL table 436 by using the remaining space of the used block. Only after the number of times the backup action of the FTL table is larger than dozens of times, the control circuit 401 needs to back up the complete FTL table 436 to the blank blocks of the non-volatile memory 120. When compared with the conventional technology, the use of the FTL table processing method of the present invention can reduce the program/erase count of the non-volatile memory 120 and increase the life time of the non-volatile memory 120.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A flash translation layer table processing method for a solid state drive, the solid state drive comprising a control circuit, a buffering unit and a non-volatile memory, the control circuit being connected with the buffering unit and the non-volatile memory, the flash translation layer table processing method comprising steps of:
    loading a flash translation layer table from a plurality of used blocks of the non-volatile memory to the buffering unit in response to determining the solid state drive is powered on, wherein a size of the flash translation layer table is smaller than a total size of the plurality of used blocks;
    in response to a valid data being written into the non-volatile memory or the valid data being moved in the non-volatile memory, amending the flash translation layer table in the buffering unit and recording at least one position of at least one amended content of the flash translation layer table in a content changed table;
    judging that a backup action on the flash translation layer table is required; and
    in response to judging the backup action on the flash translation layer table is required, determining whether a complete content of the flash translation layer table is required to be backed up to the non-volatile memory according to a total data size, wherein the total data size is a data size of the at least one amended content of the flash translation layer table plus a data size of the content changed table.

2. The flash translation layer table processing method as claimed in claim 1, further comprising steps of:
    in response to determining the complete content of the flash translation layer table is required to be backed up to the non-volatile memory, backing up the complete content of the flash translation layer table from the buffering unit to a plurality of blank blocks of the non-volatile memory; and
    in response to determining the complete content of the flash translation layer table is not required to be backed up to the non-volatile memory, backing up the at least one amended content of the flash translation layer table to a remaining space of the plurality of used blocks.

3. The flash translation layer table processing method as claimed in claim 2, wherein in response to determining the complete content of the flash translation layer table is not required to be backed up to the non-volatile memory, the content changed table is backed up to the remaining space of the plurality of used blocks.

4. The flash translation layer table processing method as claimed in claim 1, wherein the flash translation layer table in the buffering unit is divided into a plurality of table areas, wherein in response to determining a first table area of the plurality of table areas is amended, a first position of the buffering unit corresponding to the first table area is recorded in the content changed table.

5. The flash translation layer table processing method as claimed in claim 4, wherein the buffering unit is a volatile memory, and the first position of the buffering unit is an address information in the volatile memory.

6. The flash translation layer table processing method as claimed in claim 1, wherein in response to determining the total data size is larger than a size of a remaining space of the plurality of used blocks, the control circuit determines that the complete content of the flash translation layer table is required to be backed up to the non-volatile memory, wherein if in response to determining the total data size is smaller than the size of the remaining space of the plurality of used blocks, the control circuit determines that the complete content of the flash translation layer table is not required to be backed up to the non-volatile memory.

* * * * *